US012467908B2

(12) United States Patent
Tsukada et al.

(10) Patent No.: US 12,467,908 B2
(45) Date of Patent: Nov. 11, 2025

(54) LIQUID FEEDING PUMP AND LIQUID FEEDING METHOD

(71) Applicant: Hitachi High-Tech Corporation, Tokyo (JP)

(72) Inventors: Nobuhiro Tsukada, Tokyo (JP); Daisuke Akieda, Tokyo (JP); Sho Iwasa, Tokyo (JP); Yusuke Yota, Tokyo (JP); Yuichiro Hashimoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 276 days.

(21) Appl. No.: 18/032,717

(22) PCT Filed: Oct. 12, 2021

(86) PCT No.: PCT/JP2021/037736
§ 371 (c)(1),
(2) Date: Apr. 19, 2023

(87) PCT Pub. No.: WO2022/107500
PCT Pub. Date: May 27, 2022

(65) Prior Publication Data
US 2023/0384271 A1  Nov. 30, 2023

(30) Foreign Application Priority Data

Nov. 19, 2020  (JP) .................... 2020-192248

(51) Int. Cl.
*F04B 23/06* (2006.01)
*F04B 49/06* (2006.01)
(Continued)

(52) U.S. Cl.
CPC ............. *G01N 30/32* (2013.01); *F04B 23/06* (2013.01); *F04B 49/06* (2013.01); *F04B 51/00* (2013.01); *G01N 2030/326* (2013.01)

(58) Field of Classification Search
CPC .. G01N 30/32; G01N 2030/326; F04B 23/06; F04B 49/06; F04B 51/00; F04B 49/065;
(Continued)

(56) References Cited

U.S. PATENT DOCUMENTS 4,643,649 A * 2/1987 Schmid ................ F04B 49/065
 417/45
2009/0057227 A1* 3/2009 Kaji ..................... B01D 15/163
 210/101

(Continued)

FOREIGN PATENT DOCUMENTS

JP  2008-291848 A  12/2008
JP  2009-53098 A   3/2009
(Continued)

OTHER PUBLICATIONS

International Search Report (PCT/ISA/210) issued in PCT Application No. PCT/JP2021/037736 dated Nov. 30, 2021 with English translation (four (4) pages).

(Continued)

*Primary Examiner* — David J Bolduc
(74) *Attorney, Agent, or Firm* — Crowell & Moring LLP

(57) ABSTRACT

Provided is a technology for reducing the capacity of a liquid feeding pump and enabling liquid feeding with little pulsation. A liquid feeding pump according to the present disclosure is provided with: a first plunger pump having a first plunger; a second plunger pump having a second plunger and connected in series with the first plunger pump; a pressure sensor disposed downstream of the second plunger pump; and a control unit that accepts the input of a liquid discharge pressure measured by the pressure sensor and that controls the driving of the first plunger and the driving of the second plunger. The control unit calculates the rate of change in the pressure of the liquid on the basis of the past compression distances of the plunger for when the liquid (Continued)

was compressed by the first plunger pump and the pressure at the completion of compression, predicts the compression distance of the first plunger on the basis of the rate of change in pressure and the present discharge pressure, and determines the timing at which the compression performed by the first plunger will be completed on the basis of the predicted compression distance.

13 Claims, 11 Drawing Sheets

(51) Int. Cl.
 *F04B 51/00* (2006.01)
 *G01N 30/32* (2006.01)
(58) Field of Classification Search
 CPC .......... F04B 2201/0201; F04B 2205/05; F04B 11/0041; F04B 11/005; F04B 13/00
 See application file for complete search history.

(56) References Cited

U.S. PATENT DOCUMENTS

| | | | |
|---|---|---|---|
| 2013/0104631 | A1 | 5/2013 | Tokuo et al. |
| 2014/0228762 | A1* | 8/2014 | Capone ............. A61M 5/16881 604/152 |
| 2019/0365567 | A1* | 12/2019 | Balkenbush ............ F04B 9/042 |
| 2020/0182235 | A1* | 6/2020 | Yanagibayashi .......... F04B 1/02 |
| 2020/0278329 | A1 | 9/2020 | Yanagibayashi et al. |
| 2022/0252556 | A1* | 8/2022 | Yanagibayashi .......... F04B 1/02 |

FOREIGN PATENT DOCUMENTS

| | | |
|---|---|---|
| JP | 5624825 B2 | 11/2014 |
| WO | WO 2019/082243 A1 | 5/2019 |

OTHER PUBLICATIONS

Japanese-language Written Opinion (PCT/ISA/237) issued in PCT Application No. PCT/JP2021/037736 dated Nov. 30, 2021 (four (4) pages).

* cited by examiner

[FIG. 1]
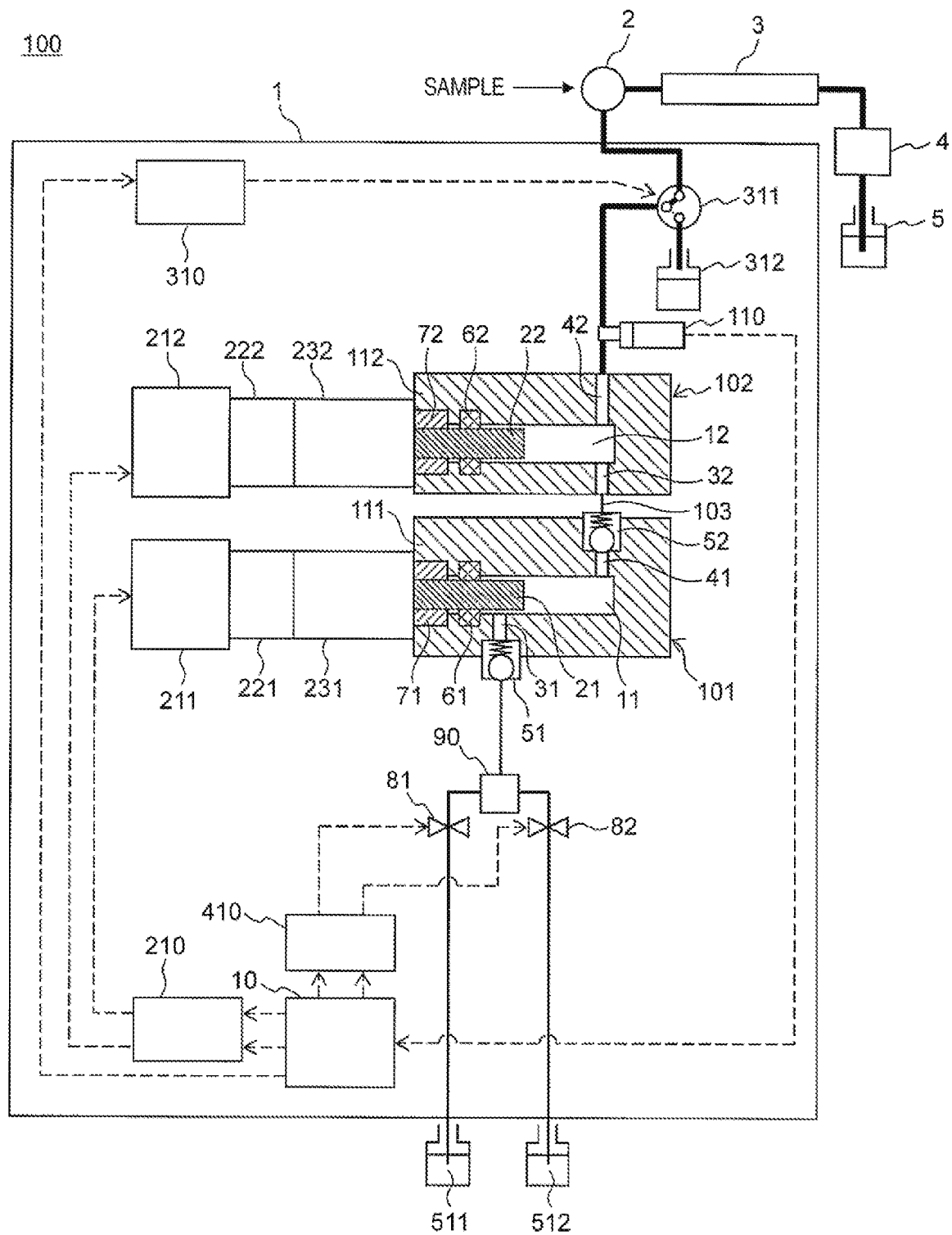

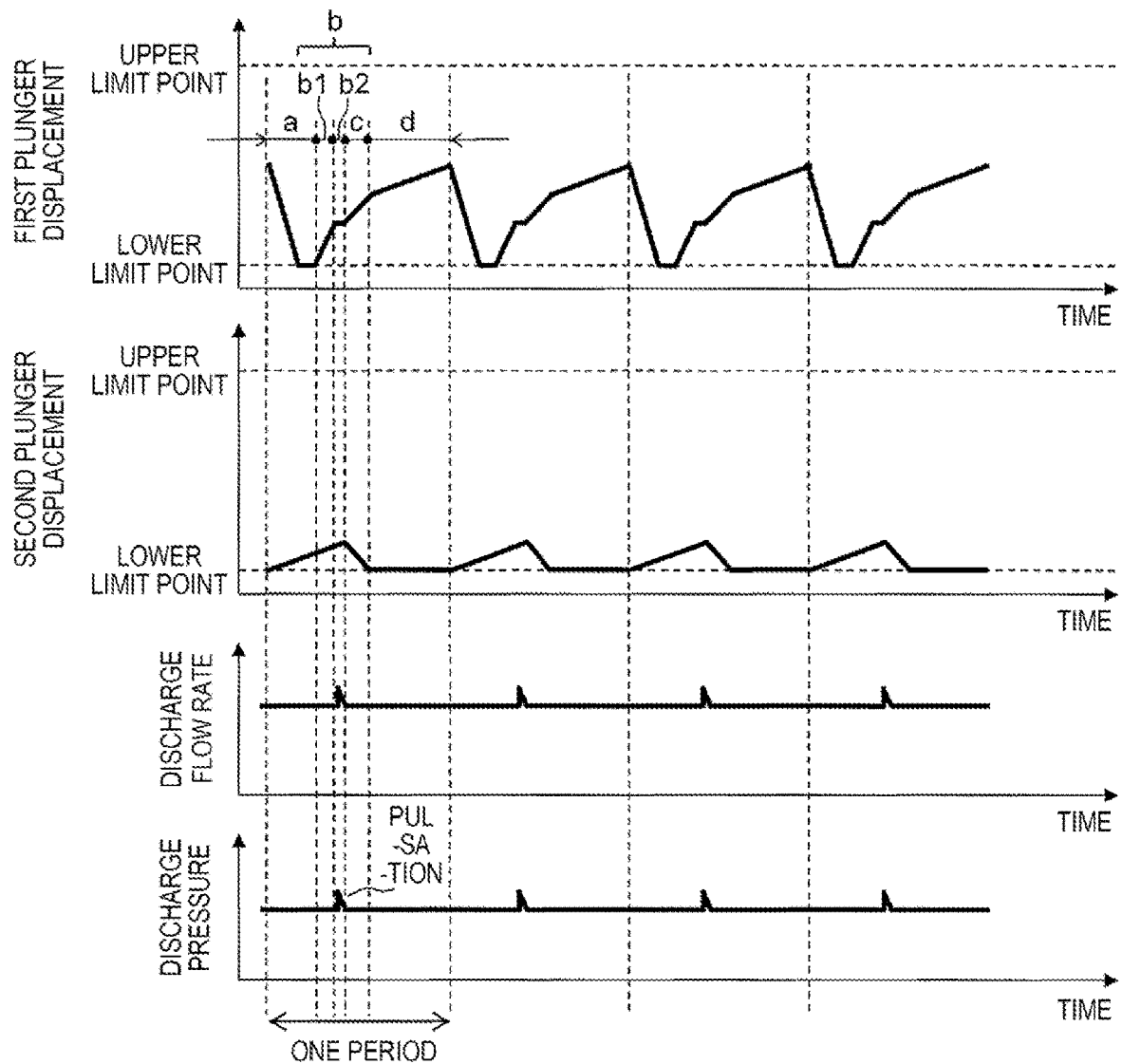
[FIG. 2]

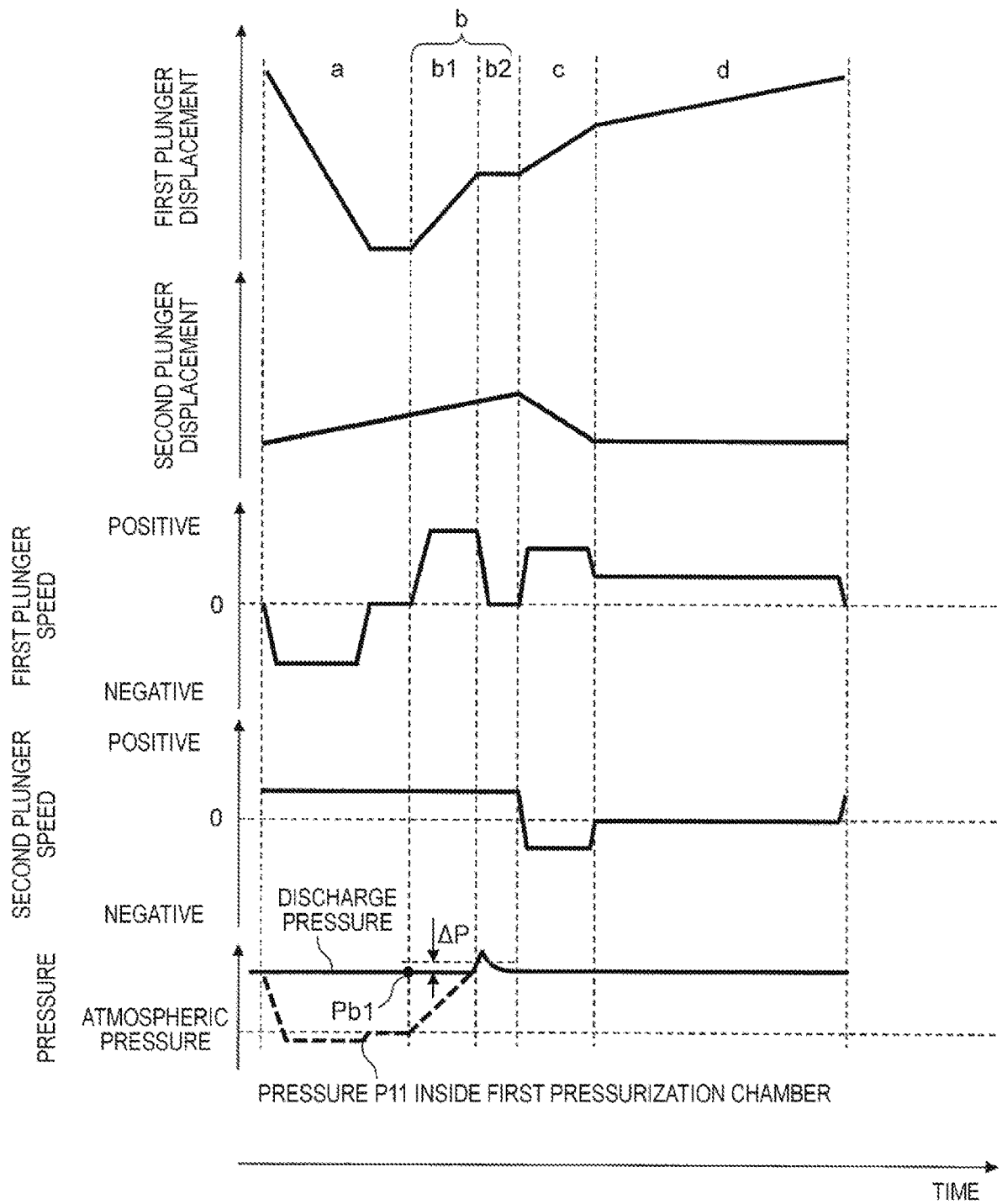

[FIG. 4]
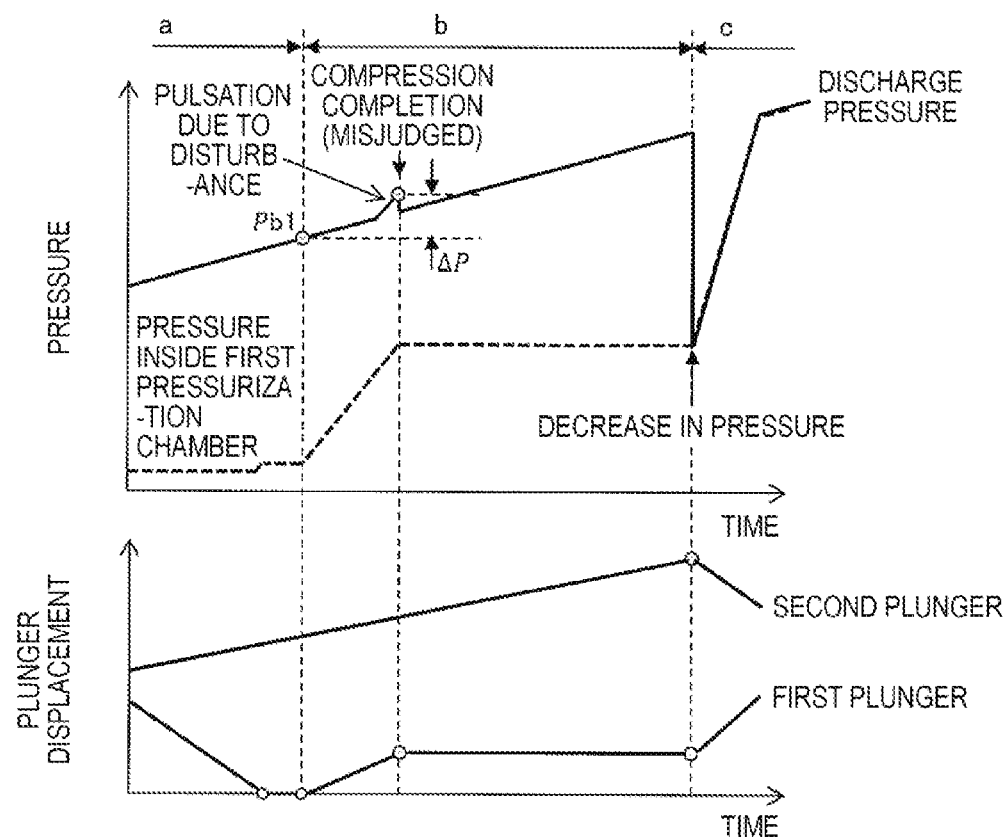

[FIG. 5]
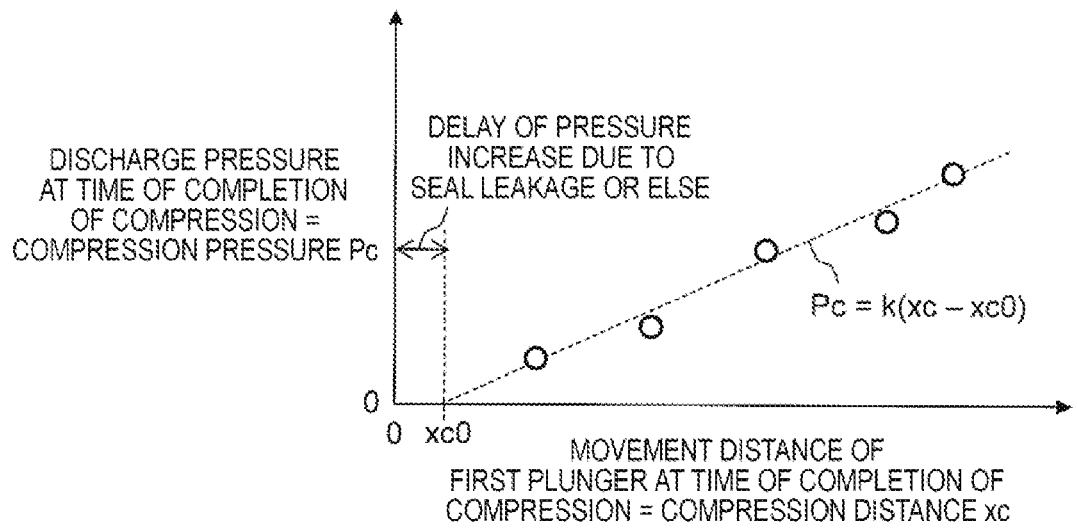

[FIG. 6A]
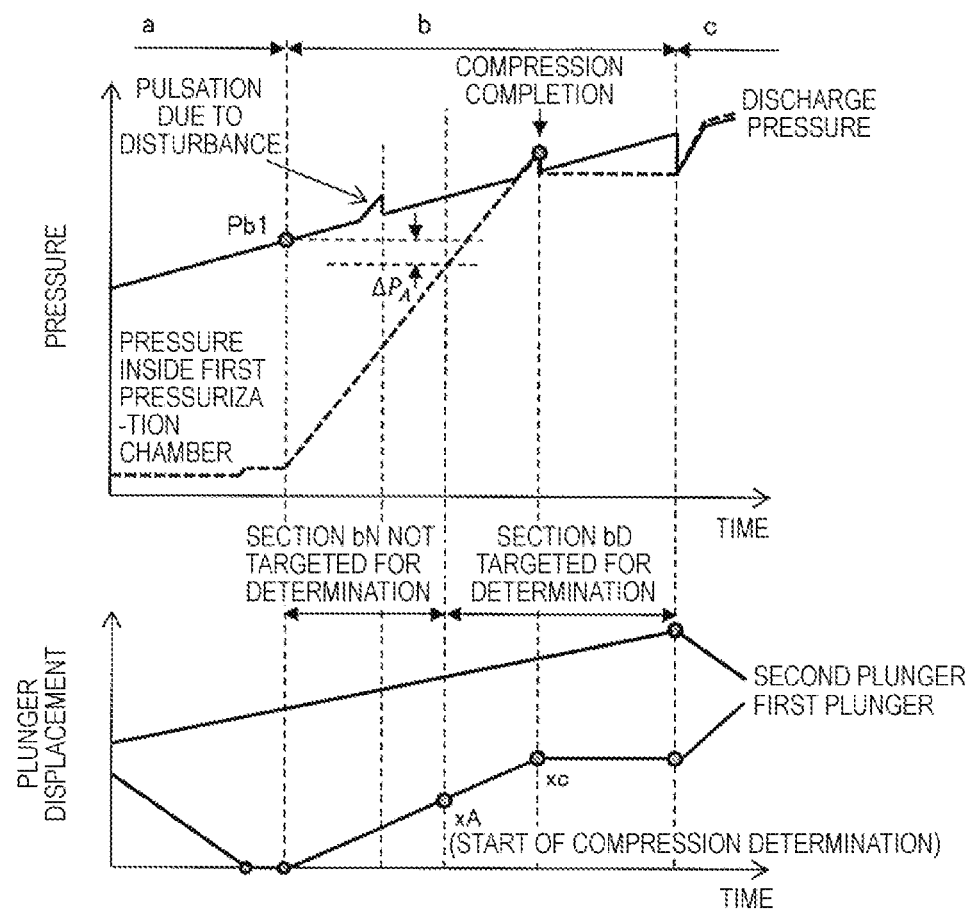

[FIG. 6B]
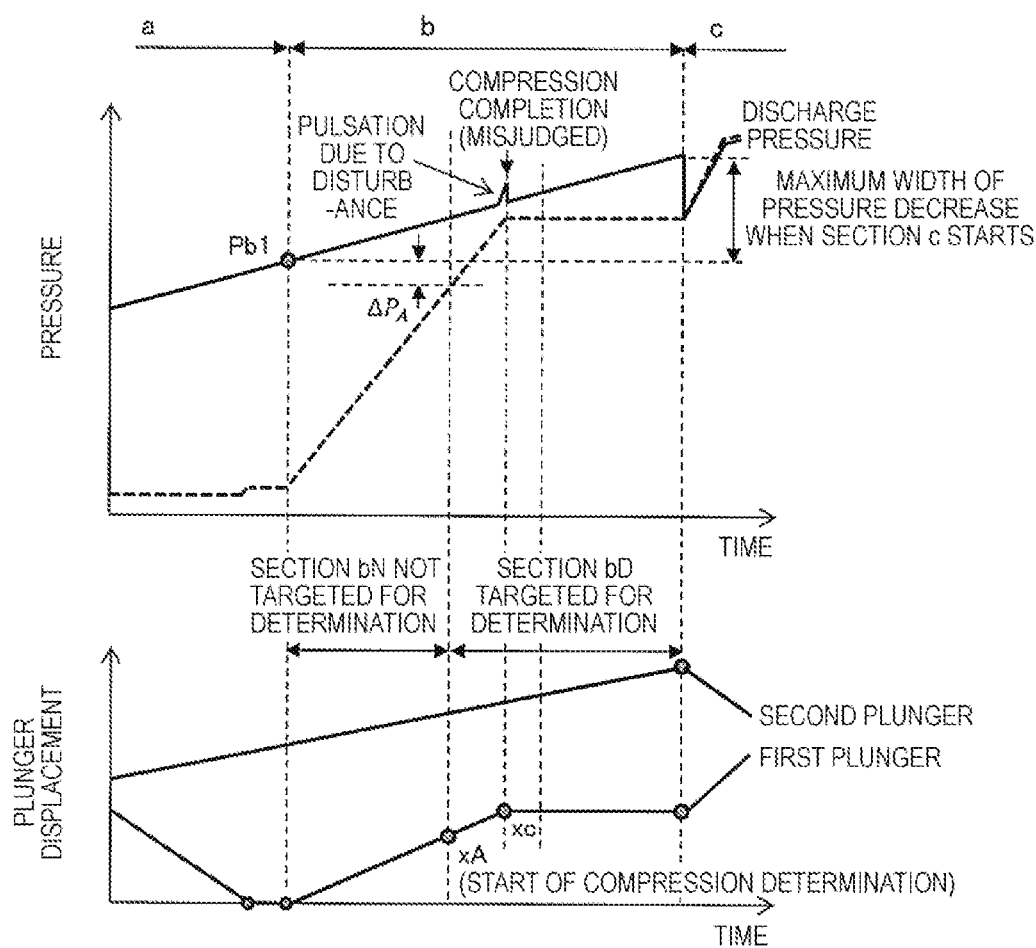

[FIG. 7]
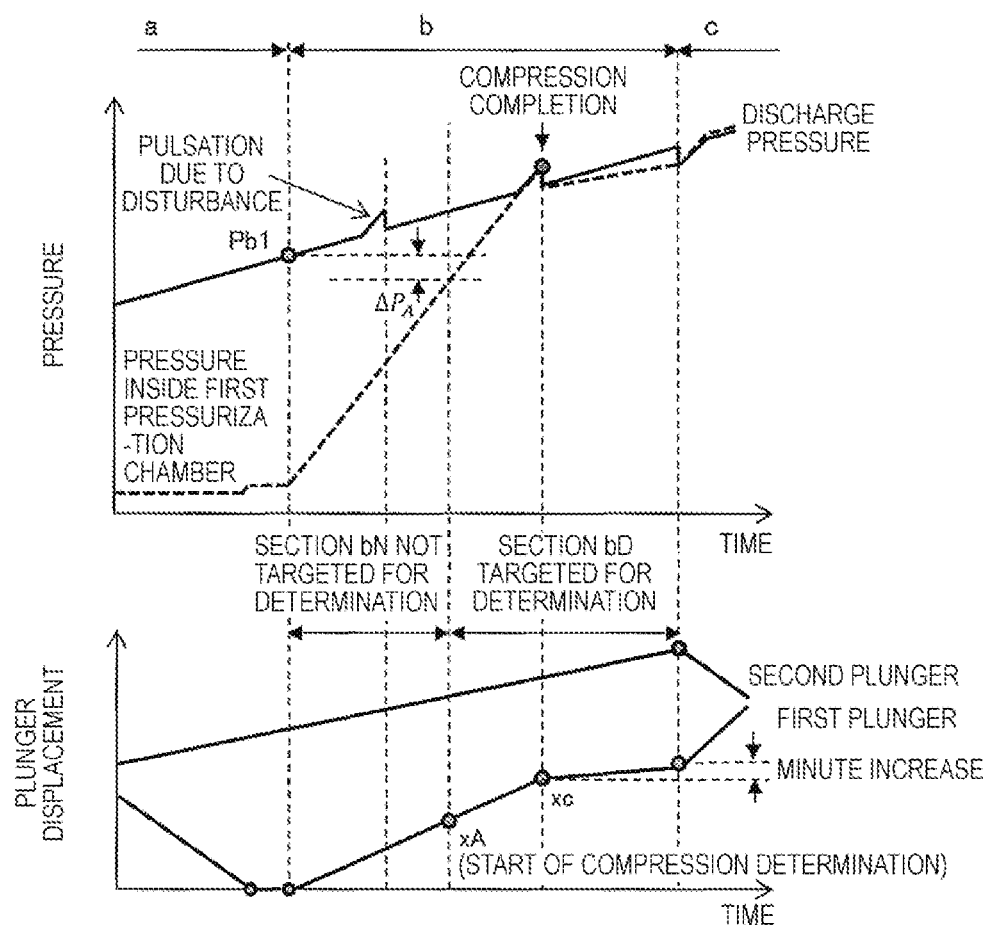

[FIG. 8]
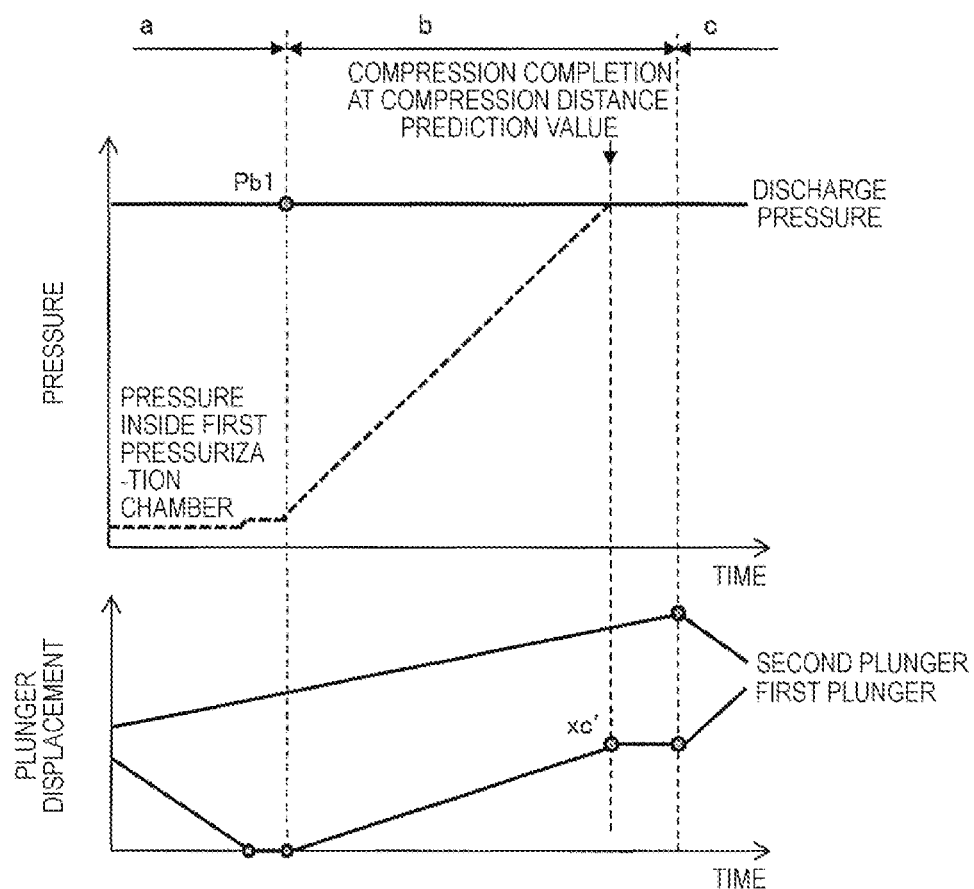

[FIG. 9]
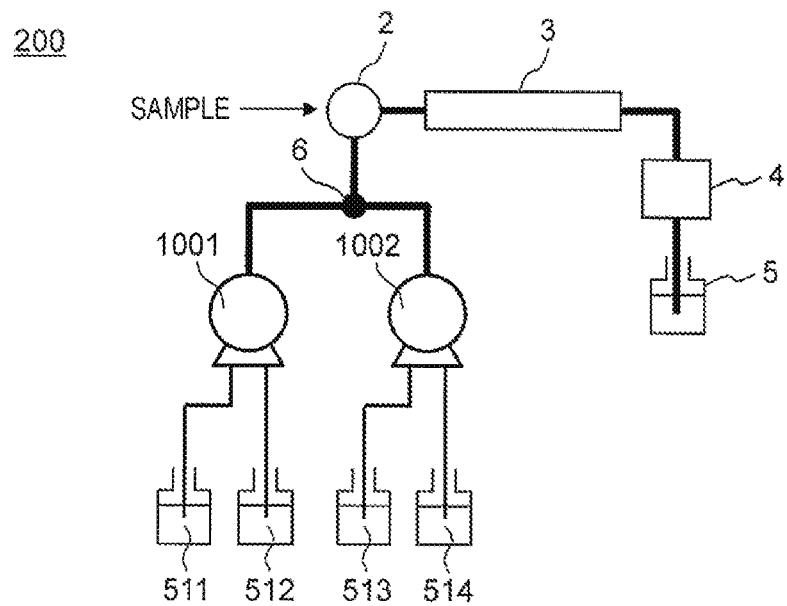
[FIG. 10]
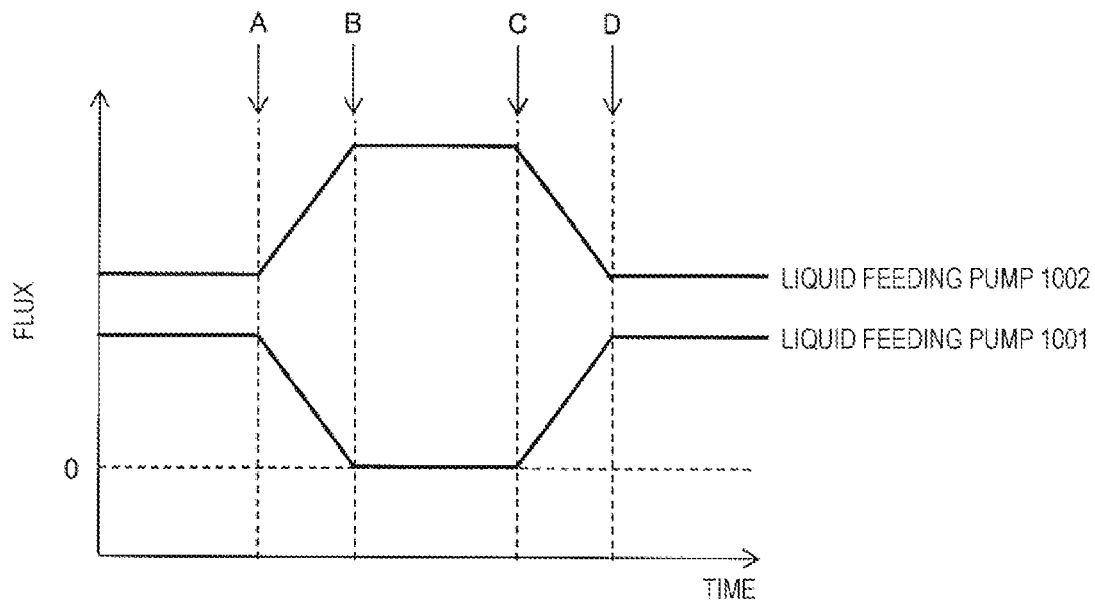

[FIG. 11]
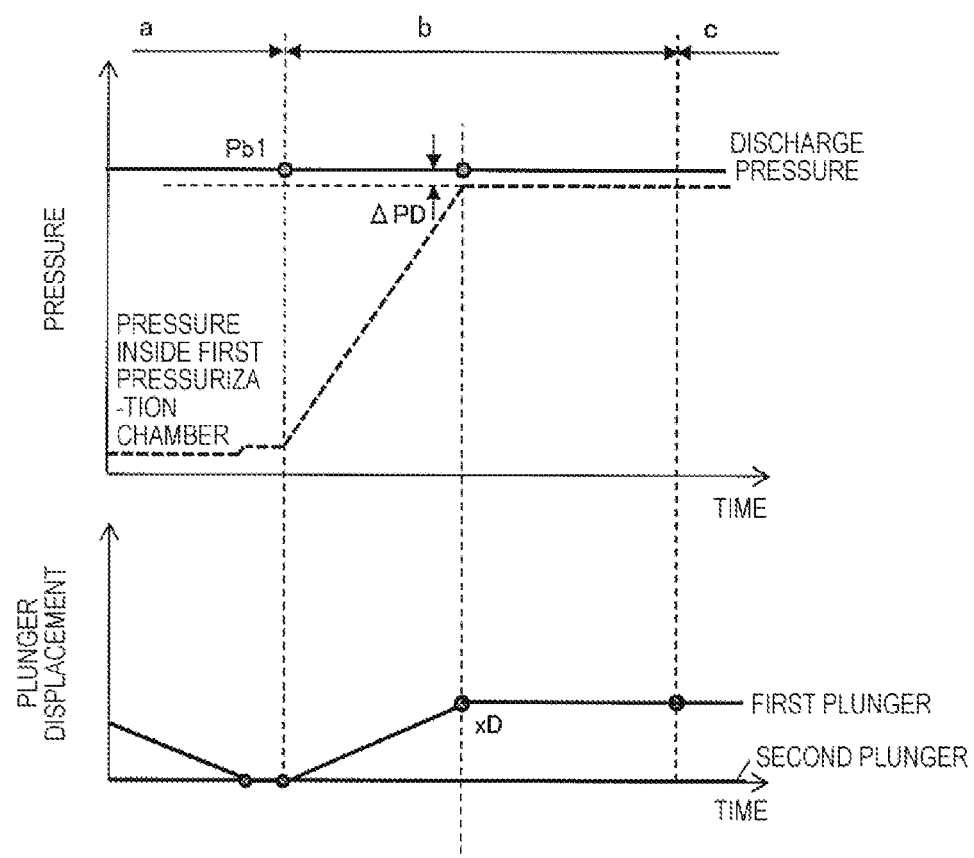

LIQUID FEEDING PUMP AND LIQUID FEEDING METHOD

TECHNICAL FIELD

The present disclosure relates to a liquid feeding pump and a liquid feeding method.

BACKGROUND ART

In analysis using a liquid chromatograph, a solvent to be used is different according to a type of sample which is a measurement target and it is necessary to exchange a solvent in a liquid feeding pump before each analysis. To perform many analyses within a fixed time as various types of samples are targets, it is necessary to perform exchange of a solvent in a short time. To perform the exchange of the solvent in a short time, it is effective to reduce a pump volume.

In general, a liquid feeding pump used for a liquid chromatograph has a configuration in which two plunger pumps are connected in series. A plunger pump located upstream (a first plunger pump) sucks, compresses, and discharges a solvent. Since a constant flow rate cannot be fed only with the first plunger pump, another plunger pump (a second plunger pump) is connected downstream. The second plunger pump performs an operation of counteracting a pulsating flow of the first plunger pump (discharging a solvent when the first plunger pump sucks and compresses the solvent), and thus the liquid feeding pump can feed a constant flow rate.

The compression of the solvent in the operation of the first plunger pump is a process of raising a pressure (a discharge pressure) of the sucked solvent at which the second plunger pump discharges the solvent from the atmospheric pressure. Here, when the pressure of the solvent is substantially the same as a discharge pressure, it is necessary to end the compression operation. When the compression operation continues over the discharge pressure (over-compression), the first and second plunger pumps discharge the solvent together in the section, a flow rate increases in the liquid feeding pump, and thus the discharge pressure is raised to that extent. When the compression is short and does not reach a discharge pressure, and the compression operation ends (compression deficiency), the first and second plunger pumps do not discharge the solvent in a subsequent process and the solvent is not fed instantaneously, and thus the discharge pressure is lowered meanwhiles. When the flow rate varies, not only does analysis accuracy of the liquid chromatograph deteriorate but a load is also applied to a separation column due to an involved pulsation of the pressure, and thus consumption is quickened.

As a technology for preventing over-compression or compression deficiency, PTL 1 discloses a liquid feeding pump that controls an operation of the first plunger pump by providing a pressure sensor measuring a pressure of a solvent in the first plunger pump and a pressure sensor measuring a pressure of a solvent discharged by the second plunger pump, and by comparing values measured by the pressure sensors in a compression process.

PTL 2 discloses a liquid feeding pump that has a configuration in which the first and second plunger pumps are connected in series and a pressure sensor is provided only downstream from the second plunger pump.

PTL 3 discloses a liquid feeding pump that corrects and controls a flow rate from a compression volume in a compression process and a history of a pressure while the compression is completed (compression pressure).

CITATION LIST

Patent Literature

PTL 1: JP5624825B
PTL 2: JP2008-291848A
PTL 3: WO2019/082243A

SUMMARY OF INVENTION

Technical Problem

However, since the pressure sensor is provided in each of the first and second plunger pumps in the liquid feeding pump of PTL 1, a pump volume increases. To reduce the pump volume and exchange the solvent in a short time, the pressure sensor may not be provided on the first plunger pump side and the volume may be reduced to that extent. However, there is a challenge that liquid feeding is implemented with little pulsation of a pressure and a flow rate on the condition that only the pressure sensor of the second plunger pump is used to control an operation of the first plunger pump.

In the liquid feeding pump disclosed in PTL 2, as described above, the pressure sensor is provided only on the second plunger pump side, and thus an increase in the pump volume can be said to be suppressed. In PTL 2, however, there is no mention about implementation of liquid feeding with little pulsation of a pressure and a flow rate.

In the liquid feeding pump disclosed in PTL 3, there is no mention about implementation of liquid feeding with little pulsation of a pressure and a flow rate either.

Accordingly, the present invention provides a technology capable of reducing a volume of a liquid feeding pump and enabling liquid feeding with little pulsation.

Solution to Problem

To solve the foregoing problems, according to an aspect of the present disclosure, a liquid feeding pump includes: a first plunger pump including a first plunger; a second plunger pump including a second plunger and connected to the first plunger pump in series; a pressure sensor disposed downstream from the second plunger pump; and a control unit configured to receive an input of a discharge pressure of a liquid measured by the pressure sensor and control driving of the first plunger and driving of the second plunger. The control unit calculates a pressure change rate of the liquid based on a past compression distance of the first plunger while the liquid is compressed by the first plunger pump and a pressure while the compression is completed, predicts a compression distance of the first plunger based on the pressure change rate and a current discharge pressure, and determines when the compression by the first plunger is completed based on the predicted compression distance.

Further features related to the present disclosure are apparent from description of the present specification and the appended drawings. Aspects of the present disclosure are achieved and implemented according to elements and combinations of the elements, subsequent detailed description, and aspects of the appended claims. The description of the present specification is a typical example and does not limit the claims and application examples of the present disclosure in any sense.

Advantageous Effects of Invention

The liquid feeding pump according to the present disclosure can reduce a volume of a liquid feeding pump and enables liquid feeding with little pulsation. The other problems, configurations, and advantageous effects are apparent from description of the following embodiments.

BRIEF DESCRIPTION OF DRAWINGS

FIG. 1 is a schematic view illustrating a configuration of a liquid chromatograph including a liquid feeding pump according to a first embodiment.

FIG. 2 is a graph illustrating a displacement of each plunger during normal liquid feeding of a solvent, and a discharge flow rate and a discharge pressure of the solvent.

FIG. 3 is a graph illustrating a method of controlling a speed of a first plunger and a speed of a second plunger.

FIG. 4 is a graph illustrating a method of controlling the first plunger according to the first embodiment.

FIG. 5 is a graph illustrating a relationship between a displacement and a pressure of the first plunger while compression is completed.

FIG. 6A is a graph illustrating a method of controlling the first plunger according to the first embodiment.

FIG. 6B is a graph illustrating a method of controlling the first plunger according to the first embodiment.

FIG. 7 is a graph illustrating a method of controlling the first plunger according to a modification example of the first embodiment.

FIG. 8 is a graph illustrating a method of controlling the first plunger according to a second embodiment.

FIG. 9 is a schematic view illustrating a configuration of a liquid chromatograph including liquid feeding pumps according to a third embodiment.

FIG. 10 is a graph illustrating a change in flow rate in the liquid feeding pumps according to the third embodiment.

FIG. 11 is a graph illustrating a method of controlling a first plunger according to the third embodiment.

DESCRIPTION OF EMBODIMENTS

First Embodiment

<Exemplary Configuration of Liquid Feeding Pump and Liquid Chromatograph>

FIG. 1 is a schematic view illustrating a configuration of a liquid chromatograph 100 including a liquid feeding pump 1 according to a first embodiment. As illustrated in FIG. 1, the liquid chromatograph 100 includes the liquid feeding pump 1, an injector 2 introducing a sample into the liquid chromatograph 100, a separation column 3, a detector 4, and a waste liquid container 5. Since the injector 2, the separation column 3, the detector 4, and the waste liquid container 5 can generally be used for liquid chromatographs, detailed configurations will not be described separately in the embodiment.

The liquid feeding pump 1 includes a controller 10 (a control unit), a pressure sensor 110, a first plunger pump 101, a second plunger pump 102, a connection flow passage 103, a first electronic valve 81, a second electronic valve 82, a motor driver 210, a purge valve driver 310, a purge valve 311, a waste liquid tank 312, and an electronic valve driver 410. The first plunger pump 101 and the second plunger pump 102 are connected in series. The first plunger pump 101 is disposed upstream and the second plunger pump 102 is disposed downstream.

The pressure sensor 110 is installed downstream from the second plunger pump 102. The pressure sensor 110 measures a pressure (a discharge pressure) of a solvent (liquid) discharged from the second plunger pump 102 and outputs a pressure value to the controller 10.

As will be described below in detail, the controller 10 gives an instruction value to the motor driver 210 and the electronic valve driver 410 based on the discharge pressure measured by the pressure sensor 110 and a predetermined operation sequence to operate the motor driver 210 and the electronic valve driver 410. The controller 10 gives an instruction value to the purge valve driver 310 based on the predetermined operation sequence to operate the purge valve driver 310.

The first plunger pump 101 includes a first pump head 111 in which a first pressurization chamber 11, a first plunger 21, a first suction passage 31, a first discharge passage 41, a first check valve 51, a second check valve 52, a first seal 61, and a bearing 71 are formed. The first check valve 51 is disposed on a flow passage of the first suction passage 31 and the second check valve 52 is disposed on a flow passage of the first discharge passage 41, and thus a flow direction of a solvent liquid is limited. The first plunger 21 (a pressurization member) is held to be slidable inside the first plunger pump 101 by the bearing 71. The first seal 61 prevents liquid leakage from the first pressurization chamber 11.

The second plunger pump 102 includes a second pump head 112 in which a second pressurization chamber 12, a second plunger 22, a second suction passage 32, a second discharge passage 42, a second seal 62, and a bearing 72 are formed. The second check valve 52 and the second suction passage 32 are connected by the connection flow passage 103. That is, the first plunger pump 101 and the second plunger pump 102 are disposed in series and the first plunger pump 101 is installed upstream. The second plunger 22 (a pressurization member) is held to be slidable inside the second plunger pump 102 by the bearing 72. The second seal 62 prevents liquid leakage from the second pressurization chamber 12.

In the present specification, a "lower limit point" indicates a position at which a plunger descends most in a range that the plunger can move inside a pressurization chamber. On the other hand, an "upper limit point" indicates a position at which a plunger ascends most in a range that the plunger can move inside a pressurization chamber. The "ascending" of the plunger indicates a motion in a direction in which a solvent in the pressurization chamber is compressed or discharged (a motion in the right direction in FIG. 1) and the "descending" of the plunger indicates a motion in a direction in which a solvent in the pressurization chamber is sucked (a motion in the left direction in FIG. 1).

A reciprocation motion of the first plunger 21 is controlled by a first electric motor 211, a deceleration device 221, and a straight motion device 231. More specifically, the motor driver 210 supplies driving power to the first electric motor 211 to rotate the first electric motor 211 based on an instruction value of the controller 10. The rotation of the first electric motor 211 is decelerated by the deceleration device 221 and is converted into a straight motion by the straight motion device 231, and thus the first plunger 21 performs a reciprocation motion.

Similarly, a reciprocation motion of the second plunger 22 is controlled by a second electric motor 212, a deceleration device 222, and a straight motion device 232. More specifically, the motor driver 210 supplies driving power to the second electric motor 212 to rotate the second electric motor 212 based on an instruction value of the controller 10. The rotation of the second electric motor 212 is decelerated by the deceleration device 222 and is converted into a straight motion by the straight motion device 232, and thus the second plunger 22 performs a reciprocation motion.

The deceleration device 221 and the straight motion device 231 are combined to serve as a power transmission mechanism device in a broad sense by amplifying rotational power of the first electric motor 211 and converting the rotation power into linear power. The same applies to the deceleration device 222 and the straight motion device 232.

Specific examples of the deceleration devices 221 and 222 include a spur gear, a pulley, a planetary gear, and a worm gear. A main reason for providing the deceleration devices 221 and 222 is that torque of the first electric motor 211 and the second electric motor 212 is increased. When the first electric motor 211 and the second electric motor 212 have a capability to generate sufficient torque, it is not necessary to install the deceleration devices 221 and 222. Specific examples of the straight motion devices 231 and 232 include a ball screw, a cam, and a rack and pinion.

The purge valve driver 310 supplies driving power to the purge valve 311 based on an instruction value of the controller 10. The purge valve 311 is connected downstream from the second plunger pump 102. The purge valve 311 switches a direction in which a solvent discharged from the liquid feeding pump 1 flows toward one of the injector 2 and the waste liquid tank 312.

The electronic valve driver 410 supplies driving power to the first electronic valve 81 and the second electronic valve 82 based on an instruction value of the controller 10. A solvent container that contains a first solvent 511 and a solvent container that contains a second solvent 512 are installed outside of the liquid feeding pump 1. The first solvent 511 or the second solvent 512 can be fed to the liquid feeding pump 1 by opening or closing the first electronic valve 81 and the second electronic valve 82 and driving the first plunger pump 101 and the second plunger pump 102 (the first plunger 21 and the second plunger 22).

When the first plunger pump 101 sucks a solvent, one of the first electronic valve 81 and the second electronic valve 82 enters an opened state and the other valve enters a closed state, and one of the first solvent 511 and the second solvent 512 is sucked. The sucked solvent passes through the first check valve 51 and the first suction passage 31 to be sucked to the first pressurization chamber 11. The solvent sucked inside the first pressurization chamber 11 is compressed as the first plunger 21 ascends.

When the solvent is compressed and an internal pressure of the first pressurization chamber 11 is greater than the internal pressure of the second pressurization chamber 12, the solvent flows in the first discharge passage 41, the second check valve 52, the connection flow passage 103, and the second suction passage 32 and is discharged from the second discharge passage 42.

The injector 2 injects a sample which is an analysis target into the solvent discharged from the liquid feeding pump 1. The solvent into which the sample is injected is introduced into the separation column 3 and is separated into components. Thereafter, the detector 4 detects absorbance, fluorescence intensity, a refractive index, or the like according to the sample components. The separation column 3 is filled with fine particles, and thus a load pressure of tens of megapascals to hundred megapascals or more is generated in the liquid feeding pump 1 due to fluid resistance when the solvent flows in gaps of the fine particles. Magnitude of the load pressure differs depending on a diameter of the separation column 3 and a passage flow rate.

When analysis using the first solvent 511 is switched to analysis using the second solvent 512, the first electronic valve 81 is switched from an opened state to a closed state before the analysis using the second solvent 512, and then the second electronic valve 82 is switched from the closed state to the opened state. Accordingly, the inside (the first check valve 51, the first suction passage 31, the first pressurization chamber 11, the first discharge passage 41, the second check valve 52, the connection flow passage 103, the second suction passage 32, the second pressurization chamber 12, the second discharge passage 42, the pressure sensor 110, the purge valve 311, and pipe lines connecting therebetween) of the liquid feeding pump 1, the injector 2, the separation column 3, and the detector 4, and the insides of pipe lines connecting therebetween are exchanged from the first solvent 511 to the second solvent 512. Here, by shortening a time in which the solvent is exchanged, it is possible to increase the number of analyses made within a certain time.

<Liquid Feeding Method>

An overview of a liquid feeding method during normal liquid feeding using the liquid feeding pump 1 according to the embodiment will be described. Here, "normal liquid feeding" is a liquid feeding method when a solvent discharged from the liquid feeding pump 1 flows in the injector 2, the separation column 3, and the detector 4 to analyze a sample. When a sample is not analyzed (when a solvent is fed to the waste liquid tank 312), a similar operation is performed. Therefore, description thereof will be omitted.

FIG. 2 is a graph illustrating a displacement of each plunger at the time of normal liquid feeding of a solvent, and a discharge flow rate and a discharge pressure of the solvent in the liquid feeding pump 1. In all of four graphs illustrated in FIG. 2, the horizontal axis represents a time and the vertical axis represents a displacement of the first plunger 21, a displacement of the second plunger 22, a discharge flow rate of the solvent, and a discharge pressure of the solvent in sequence from the top. Here, the discharge flow rate is a flow rate discharged from the liquid feeding pump 1 and the discharge pressure is a pressure detected by the pressure sensor 110. For the displacement of the first plunger 21 and the displacement of the second plunger 22, an ascending direction (the right direction of FIG. 1) is a positive direction and a descending direction (the left direction of FIG. 1) is a negative direction. For the discharge flow rate, discharge is set to be positive and suction is set to be negative.

In the normal liquid feeding, the first plunger 21 and the second plunger 22 operate together using a lower limit point as a reference.

In the normal liquid feeding, the first plunger pump 101 and the second plunger pump 102 perform a periodic operation together. In FIG. 2, four periods are illustrated. In one liquid feeding period, in a section a in which the first plunger 21 descends and sucks a solvent and a section b in which the first plunger 21 ascends and compresses the solvent, the solvent is not discharged from the first pressurization chamber 11. Therefore, the second plunger 22 ascends and discharges the solvent. As will be described below in detail, the section b includes a section b1 in which the first plunger 21 ascends and a section b2 in which the first plunger 21 stops subsequently. After the section b, in a section c in which the second plunger 22 descends and sucks the solvent, the first plunger 21 discharges the solvent corresponding to the solvent sucked by the second plunger 22 and the solvent discharged downstream of the pump. Thereafter, in the section b, the first plunger 21 ascends and discharges the solvent and the second plunger 22 stops. In such an operation, a flow rate discharged from the liquid feeding pump 1 can be kept substantially constant and a discharge pressure can also be kept substantially constant. Here, when the section b1 is completed, when the first plunger 21 continues the compression operation, a pressure of the solvent inside the first pressurization chamber 11 exceeds a discharge pressure (over-compression) and a discharge flow rate thus increases instantaneously. Accordingly, the discharge pressure also increases instantaneously. When the section b1 is completed, a compression distance of the first plunger 21 (a movement distance of the first plunger 21 in a compression process (the section b)) is not sufficient. When the pressure of the solvent inside the first pressurization chamber 11 does not reach a discharge pressure (compression deficiency), a discharge flow rate decreases instantaneously at the time of start of the section c. Accordingly, the discharge pressure also decreases instantaneously. According to the over-compression or the compression deficiency, a pulsation occurs in the discharge pressure. FIG. 2 illustrates a pressure pulsation when the over-compression occurs.

<Method of Controlling Speed of First Plunger and Speed of Second Plunger>

Next, the details of a method of controlling a speed of the first plunger 21 and a speed of the second plunger 22 to decrease a pulsation of a discharge pressure caused due to over-compression of the first plunger 21 will be described. When the controller 10 actually outputs instruction values to the motor driver 210, the speed of the first plunger 21 and the speed of the second plunger 22 are controlled by driving the first electric motor 211, the second electric motor 212, and the like according to the output values. Hereinafter, for simplicity, the controller 10 directly controls operations of the first plunger 21 and the second plunger 22 in some descriptions.

FIG. 3 is a graph illustrating a method of controlling a speed of the first plunger 21 and a speed of the second plunger 22 at the time of normal liquid feeding. FIG. 3 illustrates only an operation corresponding to one period. In all of five graphs illustrated in FIG. 3, the horizontal axis represents a time and the vertical axis represents a displacement of the first plunger 21, a displacement of the second plunger 22, a speed of the first plunger 21, a speed of the second plunger 22, and a pressure in sequence from the top. The speed of the first plunger 21 and the speed of the second plunger 22 are set to be positive at the time of ascending of the plungers and negative at the time of descending of the plungers. For the pressure, a discharge pressure measured by the pressure sensor 110 is indicated by a solid line and a pressure P11 of the solvent inside the first pressurization chamber 11 is indicated by a dotted line. Here, the discharge pressure can be measured by the pressure sensor 110, but there is no mechanism for measuring the pressure P11 of the solvent inside the first pressurization chamber 11.

In the section a, the controller 10 descends the first plunger 21 at a negative speed until the lower limit point (see FIG. 2) and ascends the second plunger 22 at a constant positive speed from the lower limit point. When a position of the first plunger 21 arrives at the lower limit point, the controller 10 temporarily stops the first plunger 21 (a speed of 0). A discharge pressure in the section a is constant. The pressure P11 of the solvent inside the first pressurization chamber 11 decreases until a pressure less than the atmospheric pressure and subsequently becomes constant. When the first plunger 21 stops, the pressure becomes the atmospheric pressure.

In the section b1, the controller 10 ascends the first plunger 21. Here, the first plunger 21 is first ascended while the speed is increased, and then the speed is caused to be a constant speed. The controller 10 continuously ascends the second plunger 22 at a constant positive speed as in the section a. A discharge pressure in the section b1 is constant. The solvent is compressed as first plunger 21 ascends, and the pressure P11 of the solvent inside the first pressurization chamber 11 increases.

When the pressure P11 of the solvent inside the first pressurization chamber 11 is greater than the discharge pressure, a pulsation arises in the discharge pressure due to the over-compression. The controller 10 determines that the compression of the solvent is completed by the pulsation of the discharge pressure. Specifically, the controller 10 sets Pb1 as discharge pressure at the time of start of the section b1 (the time of start of compression). When an output of the pressure sensor 110 is greater than the discharge pressure Pb1 by a predetermined threshold ΔP, the compression of the solvent is determined to be completed, deceleration of the first plunger 21 is started and temporarily stopped (the speed is decreased to 0). That is, when an increase amount of a discharge pressure compared to a discharge pressure at the time of start of the compression is equal to or greater than the predetermined threshold ΔP, the compression of the solvent is determined to be completed. Thereafter, the section moves to the section c.

In the section c, the controller 10 ascends the first plunger 21 at a constant speed and descends the second plunger 22 at a constant speed. When the second plunger 22 reaches the lower limit point, the section moves to a section d.

In the section d, the controller 10 ascends the first plunger 21 at a constant speed lower than that of the section c. In the section d, the controller 10 stops the second plunger 22. In the section d, a pulsation arising with the over-compression is fitted and the discharge pressure is substantially constant.

In the example of FIG. 3, the discharge pressure is substantially constant on the whole (except for a pulsation), but the discharge pressure is increased (rises to the right) over time.

<Method of Determining Timing of Compression Completion>

FIG. 4 is a diagram illustrating a case where completion of compression is misjudged. In FIG. 4, a graph of the upper drawing shows a discharge pressure (indicated by a solid line) and a pressure (indicated by a dotted line) of the solvent inside the first pressurization chamber 11 and a graph of the lower drawing shows a displacement of the first plunger 21 and a displacement of the second plunger 22. In a method of determining completion of the compression in the above-described section b, the completion of the compression is determined to be misjudged in some cases. As described above, when a pulsation arising with the over-compression in the section b is detected, it is determined that the compression is completed and the first plunger 21 is stopped. Here, for example, when a pulsation which becomes disturbance, such as a pressure pulsation (so-called injection shock) due to switching of the injector 2 at the time of injection of a sample, arises in the liquid feeding pump 1 before the completion of the compression (the first plunger 21 ascends and the pressure inside the first pressurization chamber 11 becomes equal to the discharge pressure), the first plunger 21 may stop (misjudgment of the completion of the compression) despite no sufficient increase in the pressure P11 of the solvent inside the first pressurization chamber 11. Thereafter, when the first plunger 21 ascends and the second plunger 22 descends at the time of start of the section c, the discharge pressure decreases to the pressure inside the first pressurization chamber 11 and a large decrease in pressure occurs.

In the example of FIG. 4, the discharge pressure increases (rises to the right) on the whole (except for a pulsation), and the discharge pressure is substantially constant in some cases and decreases (falls to the right) in some cases.

Accordingly, in the embodiment, to prevent misjudgment of the completion of the compression, the compression determination is not performed until a predicted pressure inside the first pressurization chamber 11 becomes a pressure lower by $\Delta PA$ than a discharge pressure Pb1 immediately before start of the compression (at the time of start of the compression). The determination of the compression is started after the pressure is exceeded. A specific method will be described below.

FIG. 5 is a graph illustrating a relationship between a displacement and a pressure of the first plunger 21 while compression is completed at a plurality of periods. In the graph of FIG. 5, the vertical axis represents a discharge pressure (a compression pressure Pc) at the time of completion of compression in the section b2 of each period and the horizontal axis represents a movement distance (a compression distance xc) of the first plunger 21 at the time of completion of compression.

First, the controller 10 sets a current period as an n-th period and calculates a rate of change k(n) in the pressure of the solvent at the time of compression at the current period from and a compression pressure Pc(n−1) and a compression distance xc(n−1) in an immediately previous period (an n−1-th period) by the following Expression (1).

$$k(n)=Pc(n-1)/(xc(n-1)-xc0) \qquad (1)$$

Expression (1) is based on the following Expression (2) expressing a relationship between the compression distance xc and the compression pressure Pc, as illustrated in FIG. 5.

$$Pc=k(xc-xc0) \qquad (2)$$

Here, xc0 is a distance corresponding to delay of an increase in the discharge pressure with respect to a movement distance of the first plunger 21 due to leakage or the like from a seal. In Expression (1), to obtain a rate of change k simply, the rate of change k is obtained from a compression pressure Pc(n−1) and a compression distance xc(n−1) in an immediately previous period of the current period. A value of xc0 is measured in advance and stored in the controller 10. Accordingly, the control can be simplified and the control can be implemented by a controller of low cost.

To obtain the relationship between the compression distance xc and the compression pressure Pc, as illustrated in FIG. 5, the rate of change k may be obtained by storing a history obtained by feeding the liquid at various pressures before the current period in the controller 10 and linearly approximating the relationship between the compression distance xc and the compression pressure Pc from the history. Accordingly, the rate of change k can be calculated more accurately. Here, xc0 is obtained automatically at the time of linear approximation and a change in delay of the increase in the pressure which is a cause of xc0 over time can be followed.

When a pressure of the solvent inside the first pressurization chamber 11 at the time of completion of the compression is estimated to be a pressure Pb1 (a current discharge pressure) at the time of start of the compression, a displacement xA of the first plunger 21 when the pressure is lower by $\Delta PA$ than that pressure can be expressed as in the following Expression (3).

$$xA(n)=(Pb1(n)-\Delta PA)/k(n)+xc0 \qquad (3)$$

The displacement xA of the first plunger 21 can be a displacement shorter by a predetermined distance than a displacement of the first plunger 21 predicted at the time of completion of the compression. The controller 10 determines a section in which the completion of the compression is not determined (a non-determination section) and a section in which the completion of the compression is determined (a determination section) by using the displacement xA of the first plunger 21 obtained with Expression (3) as a boundary. Accordingly, the controller 10 does not determine whether the compression is completed regardless of presence of a pulsation until the displacement of the first plunger 21 becomes xA. The controller starts determining whether the compression is completed when the displacement of the first plunger 21 exceeds xA.

FIG. 6A is a graph illustrating a method of determining completion of compression according to the first embodiment. In FIG. 6A, a graph of the upper drawing shows a discharge pressure (indicated by a solid line) and a pressure (indicated by a dotted line) of the solvent inside the first pressurization chamber 11 and a graph of the lower drawing shows a displacement of the first plunger 21 and a displacement of the second plunger 22. As illustrated in FIG. 6A, the controller 10 divides a section into a non-determination section bN in which the completion of the compression is determined and a determination section bD in which the completion of the compression is not determined by using the displacement xA of the first plunger 21 obtained with Expression (3) as a boundary. Even when a pulsation arises due to disturbance of the pressure in the non-determination section bN, the compression continues. Therefore, it is possible to prevent misjudgment of the completion of the compression.

FIG. 6B is a graph illustrating a method of determining completion of compression according to the first embodiment and illustrates a case where a pulsation arises due to disturbance in the determination section bD. As illustrated in FIG. 6B, when a pressure pulsation arises due to disturbance in the determination section bD, magnitude of a decrease in pressure at the time of start of the section c is a sum of $\Delta PA$ and a change in the discharge pressure at a maximum. Therefore, it is possible to prevent a larger decrease in pressure.

In Expression (3), the pressure at the time of completion of the compression is the pressure Pb1. Instead, when the pressure is a pressure in the section (the section a) before the start of the compression, that is, a pressure while the controller 10 does not monitor a pulsation of a discharge pressure, a control process can be simplified. Therefore, the control can be implemented by a controller of lower cost. For the discharge pressure Pb1, the pressure at the time of completion of the compression may be predicted according to a change in the discharge pressure. Here, the displacement xA can be calculated more accurately. Instead of the discharge pressure Pb1, Expression (3) may be frequently calculated for the current pressure and the displacement xA may be frequently updated. Here, the displacement xA can be calculated further accurately.

The example in which the liquid feeding pump 1 according to the embodiment is applied to the liquid chromatograph 100 has been described above. However, the present disclosure is not limited thereto. The liquid feeding pump 1 according to the embodiment may also be applied to other devices such as a liquid chromatograph mass spectroscope (LC/MS) in which a liquid feeding pump is used.

Modification Example of First Embodiment

FIG. 7 is a graph illustrating a method of controlling the first plunger 21 according to a modification example of the first embodiment. In the first embodiment, as described above, the first plunger 21 stops in the section b2 after the compression is completed. In the modification example, however, as illustrated in a lower part of the graphs of FIG. 7, the first plunger 21 is minutely ascended in the section b2. In other words, the controller 10 decreases a speed of the first plunger 21 and continues the compression after the compression is completed. Accordingly, as illustrated in an upper part of the graphs of FIG. 7, a decrease (a pulsation) in the pressure at the time of start of the section c can be small. The scheme according to the modification example can also be applied to the following embodiment.

Conclusion of First Embodiment

In the liquid feeding pump 1 according to the embodiment, as described above, the rate of change k in the pressure of the solvent is calculated based on the compression pressure Pc at the time of completion of the compression in a past period and the compression distance xc of the first plunger 21 in the compression process (the section b) for the solvent by the first plunger 21, the displacement xA (a predetermined distance shorter than a predicted compression distance) of the first plunger 21 when the pressure of the solvent inside the first pressurization chamber 11 is lower by ΔPA than the discharge pressure Pb1 is calculated based on the rate of change k in the pressure and the discharge pressure Pb1 (the current discharge pressure) at the time of start of the compression, and a period in which the completion of the compression is judged (when the compression by the first plunger 21 is completed) is determined based on the displacement xA. When the displacement of the first plunger 21 exceeds xA, the first plunger 21 is ascended, and an output of the pressure sensor 110 is greater by the predetermined threshold ΔP than the discharge pressure Pb1, the compression of the solvent is determined to be completed and the first plunger 21 is temporarily stopped. Accordingly, a probability of the completion of the compression being misjudged is reduced, and even in the case of misjudgment, a pressure pulsation arising as a result is decreased.

Through liquid feeding with little pressure pulsation, noise occurring in the detector decreases, and thus analysis with high sensitivity can be implemented. Because a pressure pulsation is little, a load applied to the separation column decreases and a lifespan of the separation column can be lengthened.

The liquid feeding pump 1 according to the embodiment may include only one pressure sensor 110 (the second plunger pump 102 located downstream) to estimate a pressure inside the first pressurization chamber 11 of the first plunger pump 101 by Expression (1). Accordingly, since a pump volume is less than when two pressure sensors are used, the solvent can be exchanged quickly. Since the number of pressure sensors is only one, cost of the device can be reduced more than when two pressure sensors are installed. Since the number of pressure sensors is only one, it is not necessary to adjust a solid difference in the pressure sensor and production efficiency can be improved.

Second Embodiment

In the first embodiment, the detection of the pressure pulsation due to over-compression and the stopping of the compression by the first plunger 21 have been described. Accordingly, in a second embodiment, a method of decreasing a pressure pulsation associated with determination of compression by completing the compression with a prediction value of a compression distance of the first plunger 21 will be proposed.

As a configuration of a liquid feeding pump according to the embodiment, the same configuration as that of the liquid feeding pump 1 according to the first embodiment, as illustrated in FIG. 1, can be adopted.

<Method of Determining Timing of Completion of Compression>

FIG. 8 is a graph illustrating a method of determining completion of compression according to a second embodiment. The controller 10 obtains a rate of change k(n) in a pressure of a solvent in Expression (1), estimates a compression pressure as the discharge pressure Pb1 at the time of start of the compression, and calculates a displacement xc' (a prediction value of a compression distance) of the first plunger 21 stopping the compression by the following Expression (4).

$$xc'(n)=Pb1(n)/k(n)+xc0 \qquad (4)$$

In the process according to the first embodiment, completion of compression is determined on the assumption that a pulsation arises at the time of compression. In the second embodiment, however, the completion of the compression is determined when there is no pulsation until the displacement of the first plunger 21 becomes xc'. Accordingly, a pulsation at the time of completion of compression can be further decreased. When there is a pulsation in a discharge pressure until the displacement of the first plunger 21 becomes xc' from the time of start of the compression, the controller 10 can determine that the compression is completed as in the first embodiment.

In Expression (4), as described above, the pressure at the time of completion of the compression is set to the discharge pressure Pb1. Instead, when the pressure is a pressure in the section (the section a) before the start of the compression, that is, a pressure while the controller 10 does not monitor a pulsation of a discharge pressure, a control process can be simplified. Therefore, the control can be implemented by a controller of lower cost. For the discharge pressure Pb1, the pressure at the time of completion of the compression may be predicted according to a change in the discharge pressure. Here, the displacement xc' can be calculated more accurately. Instead of the discharge pressure Pb1, Expression (4) may be frequently calculated for the current pressure and the displacement xc' may be frequently updated. Here, the displacement xc' can be calculated further accurately and a pulsation can be decreased as a result.

Conclusion of Second Embodiment

In the liquid feeding pump 1 according to the embodiment, as described above, the rate of change k in the pressure is calculated based on the compression pressure Pc at the time of completion of the compression in a past period and the compression distance xc of the first plunger 21 in the compression process (the section b) for the solvent by the first plunger 21, the displacement xc' (the compression distance) of the first plunger 21 at the time of completion of the compression is predicted based on the rate of change k in the pressure and the discharge pressure Pb1 (the current discharge pressure) at the time of start of the compression, and the compression of the solvent is completed and the compression is stopped when the displacement becomes xc'

(the predicted compression distance) of the first plunger 21 (when the first plunger 21 completes the compression is determined based on the displacement xc'). Accordingly, the pressure pulsation can be decreased. As described in the first embodiment, misjudgment of the completion of the compression due to disturbance is not made.

Third Embodiment

In the first embodiment, as described above, the pressure pulsation due to over-compression is detected within a determination period of the compression of the compression and the compression by the first plunger 21 is stopped. In the second embodiment, as described above, the compression by the first plunger 21 is stopped when a prediction value of the compression distance is obtained. In a third embodiment, as another method of decreasing a pressure pulsation associated with determination of compression, a technology for stopping the compression immediately before a prediction value of a compression distance when a flow rate of a liquid feeding pump becomes 0 will be proposed.

<Exemplary Configuration of Liquid Chromatograph>

FIG. 9 is a schematic view illustrating a configuration of a liquid chromatograph 200 including liquid feeding pumps 1001 and 1002 according to the third embodiment. As illustrated in FIG. 9, a liquid chromatograph 200 includes liquid feeding pumps 1001 and 1002, an injector 2 introducing a sample into the liquid chromatograph 200, a separation column 3, a detector 4, and a waste liquid container 5. A specific configuration of each of the liquid feeding pumps 1001 and 1002 is similar to the configuration of the liquid feeding pump 1 according to the first embodiment. Constituents generally used for a liquid chromatograph can be used as the injector 2, the separation column 3, the detector 4, and the waste liquid container 5.

The liquid chromatograph 200 according to the embodiment has a configuration of a so-called high-pressure gradient in which two sets of the liquid feeding pumps are connected in parallel. The liquid feeding pumps 1001 and 1002 feed other solvents (the liquid feeding pump 1001 feeds solvents 511 and 512 and the liquid feeding pump 1002 feeds solvents 513 and 514), and the solvents are mixed downstream from a junction 6 and fed to the separation column 3. Each of flow rates of the liquid feeding pumps 1001 and 1002 is appropriately set according to an analysis item.

<Method of Determining Timing of Completion of Compression>

FIG. 10 is a graph illustrating a change in flow rate in the liquid feeding pumps 1001 and 1002. As illustrated in FIG. 10, when there is a section (times B to C) in which a flow rate of one liquid feeding pump (the liquid feeding pump 1001 in FIG. 10) is 0 and the liquid feeding pump 1001 is completely stopped in the section, an internal pressure of the solvent is the atmospheric pressure. Then, the solvent is not fed until the pressure of the solvent at a timing (the time C) at which the liquid feeding is resumed increases from the atmospheric pressure to the discharge pressure, and reversely flows from the liquid feeding pump 1002 side toward the liquid feeding pump 1001 side. As a result, a pulsation of the pressure arises. To prevent such pulsation, the liquid feeding pump 1001 does not discharge (feed) the solvent in the section (the times B to C) in which the flow rate is 0, but it is necessary to perform the compression. Here, in the embodiment, the pulsation is prevented from arising by stopping the compression immediately before the compression of the liquid feeding pump 1001 is completed.

FIG. 11 is a graph illustrating a method of controlling the first plunger 21 of the liquid feeding pump 1001 according to the embodiment. The controller 10 obtains a rate of change $k(m)$ of the pressure of the solvent in Expression (1) as in the first embodiment. A period in which the rate of change $k$ is obtained is set to an m-th period (for example, a period including a timing until a time A of FIG. 10) before the section (the times B to C in FIG. 10) in which the flow rate is 0. The controller 10 estimates that the compression pressure is the discharge pressure $Pb1$ at the time of start of the compression and calculates a displacement $xD$ of the first plunger 21 stopping the compression by the following Expression (5).

$$xD(n)=(Pb1(n)-\Delta PD)/k(m)+xc0 \qquad (5)$$

Here, $\Delta PD$ is a difference between an estimation value of the compression pressure and a pressure at which the compression is stopped. $\Delta PD$ can be determined by an experiment carried out in advance and can be set to, for example, a value of 5% to 10% of the discharge pressure $Pb1$. As a value of $Pb1-\Delta PD$ is closer to a value of the discharge pressure $Pb1$, a pulsation of a timing (the time C) at which the liquid feeding is resumed can be decreased.

In Expression (5), as descried above, the pressure at the time of completion of the compression is set to the discharge pressure $Pb1$ at the time of start of the compression. Instead, when the pressure is a pressure in the section (the section a) before the start of the compression, that is, a pressure while the controller 10 does not monitor a pulsation of a discharge pressure, a control process can be simplified. Therefore, the control can be implemented by a controller of lower cost. For the discharge pressure $Pb1$, the pressure at the time of completion of the compression may be predicted according to a change in the discharge pressure. Here, the displacement $xD$ can be calculated more accurately. Instead of the discharge pressure $Pb1$, Expression (5) may be frequently calculated for the current pressure and the displacement $xD$ may be frequently updated. Here, the displacement $xD$ can be calculated further accurately and a pulsation can be decreased as a result.

Conclusion of Third Embodiment

In the liquid feeding pump 1001 according to the embodiment as described above, when a flow rate becomes 0, the rate of change $k$ in the pressure is calculated based on the compression pressure $Pc$ at the time of completion of the compression in a past period before the flow rate is 0 and the compression distance $xc$ of the first plunger 21, the displacement $xD$ (a predetermined distance shorter than predicted compression distance) of the first plunger 21 while the pressure of the solvent inside the first pressurization chamber 11 is lower by $\Delta PD$ than the discharge pressure $Pb1$ based on the rate of change $k$ in the pressure and the discharge pressure $Pb1$ (the current discharge pressure) at the time of start of the compression, and the compression of the solvent is completed (stopped) when the displacement becomes $xD$ of the first plunger 21 (when the first plunger 21 completes the compression is determined based on the displacement $xD$). Accordingly, a pulsation when the liquid feeding is resumed can be decreased.

Modification Examples

The present disclosure is not limited to the above-described embodiments and includes various modification examples. For example, the above-described embodiments have been described in detail to facilitate description of the present disclosure and all the above-described configurations may not be included. A part of a certain embodiment can be exchanged with an exemplary configuration of another embodiment. To a configuration of a certain embodiment, a configuration of another embodiment may be added. For a part of the configuration of each embodiment, part of other embodiments may be added, deleted, or exchanged.

REFERENCE SIGNS LIST

1: liquid feeding pump
2: injector
3: separation column
4: detector
5: waste liquid container
10: controller
11: first pressurization chamber
12: second pressurization chamber
21: first plunger
22: second plunger
31: first suction passage
32: second suction passage
41: first discharge passage
42: second discharge passage
51: first check valve
52: second check valve
100: liquid chromatograph
101: first plunger pump
102: second plunger pump
103: connection flow passage
110: pressure sensor
210: motor driver
310: purge valve driver
410: electronic valve driver

The invention claimed is:

1. A liquid feeding pump comprising:
a first plunger pump including a first plunger;
a second plunger pump including a second plunger and connected to the first plunger pump in series;
a single pressure sensor disposed downstream from the second plunger pump; and
a control unit configured to receive an input of a discharge pressure of a liquid measured by the single pressure sensor and control driving of the first plunger and driving of the second plunger based on the input from only the single pressure sensor, wherein
the control unit calculates a pressure change rate of the liquid based on a past compression distance of the first plunger while the liquid is compressed by the first plunger pump and a pressure while the compression is completed, predicts a compression distance of the first plunger based on the pressure change rate and a current discharge pressure, and determines when the compression by the first plunger is completed based on the predicted compression distance.

2. The liquid feeding pump according to claim 1, wherein the control unit sets a period in which a displacement of the first plunger exceeds a predetermined distance shorter than the predicted compression distance as a period in which the completion of the compression is determined.

3. The liquid feeding pump according to claim 2, wherein, in the period in which the completion of the compression is determined, the control unit stops the compression when a pulsation of the discharge pressure arises.

4. The liquid feeding pump according to claim 1, wherein the control unit stops the compression when the displacement of the first plunger is the predicted compression distance.

5. The liquid feeding pump according to claim 1, wherein, when a flow rate becomes 0, the control unit stops the compression when the displacement of the first plunger is a predetermined distance shorter than the predicted compression distance.

6. The liquid feeding pump according to claim 5, wherein the control unit calculates the pressure change rate based on the pressure distance of the first plunger before the flow rate is 0 and a pressure when the compression is completed.

7. The liquid feeding pump according to claim 1, wherein the control unit estimates the current discharge pressure as a pressure of the liquid inside the first plunger pump when the compression is completed, and predicts the compression distance.

8. The liquid feeding pump according to claim 1, wherein the control unit sets the discharge pressure while the compression is started as the current discharge pressure.

9. The liquid feeding pump according to claim 1, wherein the control unit sets the discharge pressure before the compression is started as the current discharge pressure.

10. The liquid feeding pump according to claim 1, wherein the control unit updates the prediction of the compression distance at each measurement of the current discharge pressure.

11. The liquid feeding pump according to claim 1, wherein the control unit stops the first plunger only for a predetermined time after the compression is determined to be completed.

12. The liquid feeding pump according to claim 1, wherein the control unit reduces a speed of the first plunger and continues the compression after the compression is determined to be completed.

13. A liquid feeding method performed by a control unit that controls a liquid fed by a liquid feeding pump, the liquid feeding pump including a first plunger pump including a first plunger, a second plunger pump including a second plunger and connected to the first plunger pump in series, and a single pressure sensor disposed downstream from the second plunger pump and measuring a discharge pressure of a liquid of the second plunger pump, the method comprising:
receiving, by the control unit, an input of the discharge pressure of the liquid measured by the single pressure sensor and controlling driving of the first plunger and driving of the second plunger based on the input from only the single pressure sensor;
calculating, by the control unit, a pressure change rate of the liquid based on a past compression distance of the first plunger while the liquid is compressed by the first plunger pump and a pressure while the compression is completed;
predicting, by the control unit, a compression distance of the first plunger based on the pressure change rate and a current discharge pressure; and
determining, by the control unit, when the compression by the first plunger is completed based on the predicted compression distance.

* * * * *